United States Patent [19]
Hampton

[11] Patent Number: 5,960,579
[45] Date of Patent: Oct. 5, 1999

[54] FISHING RIG

[76] Inventor: Clint D. Hampton, 209 Riviera St., Corpus Christi, Tex. 78418

[21] Appl. No.: 08/970,090

[22] Filed: Nov. 13, 1997

[51] Int. Cl.$^6$ ..................................................... A01K 93/00
[52] U.S. Cl. ............................... 43/41.2; 43/43.1; 43/44.9
[58] Field of Search .............................. 43/41, 41.2, 43.1, 43/43.11, 44.9, 44.99

[56] References Cited

U.S. PATENT DOCUMENTS

| | | |
|---|---|---|
| 2,014,517 | 9/1935 | Beregow . |
| 2,140,724 | 12/1938 | Stefan . |
| 2,292,743 | 8/1942 | Cordry . |
| 2,844,907 | 7/1958 | Merton ................................... 43/44.99 |
| 2,910,798 | 11/1959 | Bias ........................................ 43/44.9 |
| 2,926,452 | 3/1960 | Lewis ...................................... 43/43.1 |
| 3,303,596 | 2/1967 | Lewis et al. . |
| 3,611,613 | 10/1971 | Perches .................................... 43/41.2 |
| 3,753,309 | 8/1973 | Bryant ..................................... 43/41.2 |
| 3,939,593 | 2/1976 | East ............................................ 43/41 |
| 4,534,127 | 8/1985 | Thorvaldsen ............................. 43/41.2 |
| 4,610,104 | 9/1986 | Garcia ...................................... 43/41.2 |
| 5,398,440 | 3/1995 | Amundsen ............................... 43/43.1 |
| 5,758,451 | 6/1998 | Wolfe ...................................... 43/44.9 |

FOREIGN PATENT DOCUMENTS

| | | |
|---|---|---|
| 2848070 | 5/1979 | Germany . |
| 101177 | 12/1963 | Norway . |
| 1364481 | 8/1974 | United Kingdom . |

*Primary Examiner*—Kurt Rowan
*Attorney, Agent, or Firm*—Stephen R. Greiner

[57] ABSTRACT

A fishing rig including a leader with a hook secured to one of its ends and a swivel secured to the other. A guide is slidably positioned on the leader. The guide includes a conically-shaped body with a tapered bore for selectively receiving the hook. The small end of the guide is provided with a metallic bushing which acts as a sinker and a passage for the leader. Between the funnel and the hook, a float is slidably positioned on the leader to aid in withdrawing the hook from the guide after casting. A removable cover may be employed after use of the fishing rig to store the leader, hook and float within the guide for later use and transport.

13 Claims, 1 Drawing Sheet

U.S. Patent
Oct. 5, 1999
5,960,579
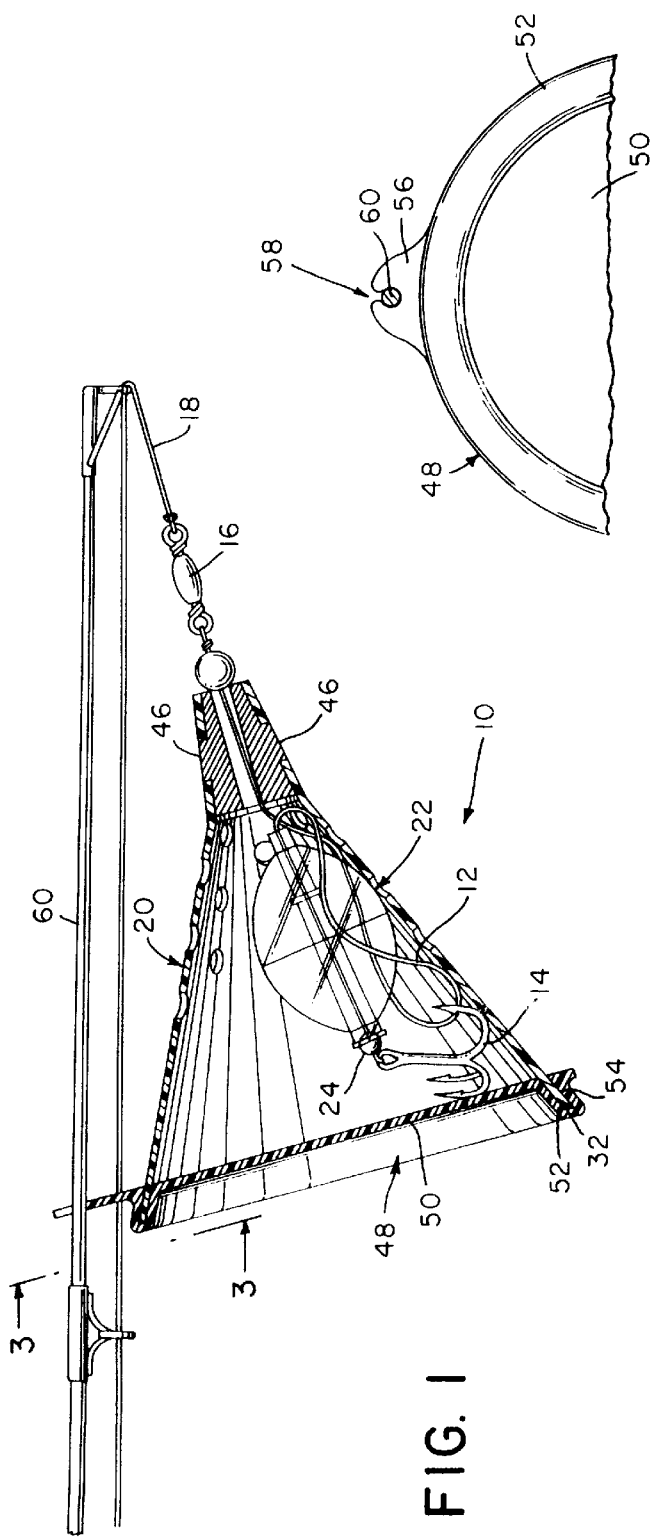
FIG. 1
FIG. 3
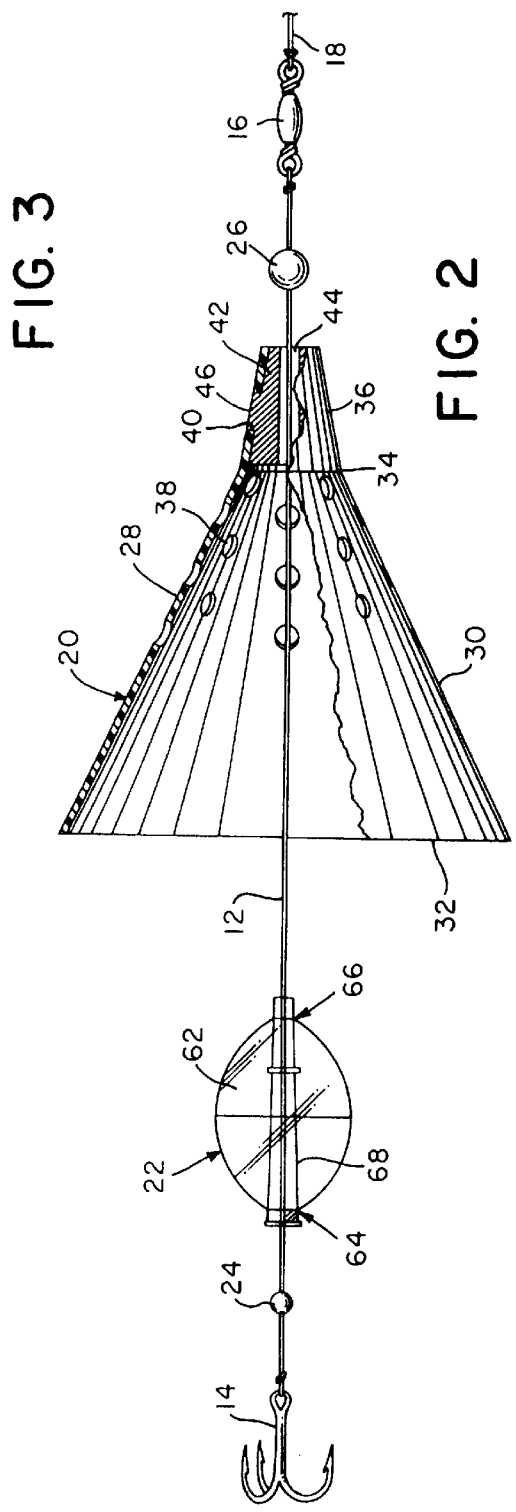
FIG. 2

FISHING RIG

FIELD OF THE INVENTION

The present invention relates generally to apparatus for fishing and, in particular, to line-attached bodies, hooks and rigs.

BACKGROUND OF THE INVENTION

Devices for preventing the barbed end of a fishing hook from snagging on submerged vegetation, rocks and other items while being pulled through the water have been proposed in the past. Some of these devices have clever guards for enclosing the hook and attached bait during casting and retrieving. A tendency of the hook to catch within the guard itself has, perhaps, limited the acceptance of such devices by fishermen.

SUMMARY OF THE INVENTION

In light of the problems associated with the prior art, it is a principal object of the invention to provide a fishing rig which will shield a fishing hook from submerged vegetation and other snags while being pulled through the water and will, automatically and in a fail-safe manner, move the fishing hook to a fish-attracting position when pulling is ceased.

It is another object of the invention to provide a fishing rig of the type described which will automatically position the fishing hook at a predetermined distance from the bottom of a body of water where the rig is being used.

It is a further object of the invention to provide a fishing rig which will partially cover the head of a hooked fish to limit the field of view of the fish when such is being retrieved and reduce the likelihood of the fish swimming for cover.

Still another object of the invention is to provide a fishing rig which may be safely transported and self-stored.

It is an object of the invention to provide improved elements and arrangements thereof in a fishing rig for the purposes described which is lightweight in construction, inexpensive in manufacture, and fully effective in use.

Briefly, the fishing rig in accordance with this invention achieves the intended objects by featuring: a leader with a hook secured to one of its ends, a swivel secured to the other end thereof, and a guide slidably positioned therebetween. The guide includes a conically-shaped body with a tapered bore for selectively receiving the hook. The small end of the guide is provided with a metallic bushing which acts as a sinker and a passage for the leader. Between the funnel and the hook, a float is slidably positioned on the leader to aid in withdrawing the hook from the guide after casting. A removable cover may be employed after use of the fishing rig to store the leader, hook and float within the guide for later use and transport.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a cross-sectional view of a fishing rig in accordance with the present invention shown secured by means of a removable cover to the end of a conventional fishing rod for transport and storage.

FIG. 2 is a side elevational view of the fishing rig of FIG. 1 with portions broken away to reveal interior details thereof and with the cover removed for use.

FIG. 3 is a cross-sectional view taken along line 3—3 of FIG. 1 showing details of the retaining tab of the removable cover.

Similar reference characters denote corresponding features consistently throughout the accompanying drawings.

DETAILED DESCRIPTION OF THE PREFERRED EMBODIMENT

Referring now to FIGS., a fishing rig in accordance with the present invention is shown generally at 10. The fishing rig 10 includes a flexible leader 12 having a treble hook 14 secured to one of its ends and a swivel 16 secured to its other end for connecting the leader 12 to a fishing line 18. A funnel-shaped guard 20 is slidably positioned on the leader 12 between the hook 14 and swivel 16. Between the guard 20 and the hook 14, a float 22 is slidably placed on the leader 22. Beads 24 and 26 on the leader 12 prevent the hook 14 and swivel 16 from passing, respectively, into the float 22 and guard 20.

The guard 20 includes a flexible body 28 formed of a nonbuoyant plastic or other suitable material. The body 28 has a hollow, conical portion 30 which tapers from a relatively wide rim 32 defining a large end in said body to a narrow apex 34 at the other. A narrow, tubular portion 36 extends a short distance from the apex 34 of the conical portion 30 and defines a small end in body 28. The conical and tubular portions 30 and 36 define a tapered bore extending the length of the body 28.

Apertures 38 and 40 are provided in the conical and tubular portions 30 and 36 of the body 28. As shown, the conical portion 30 includes a number of circular apertures 38 positioned in a zone extending about one-half of the distance from the apex 34 to the rim 32. At least two elongated apertures 40 are provided, on the other hand, in the tubular portion 36.

A metallic bushing 42 is molded into the tubular portion 36 of the body 28. The bushing 42 includes a longitudinal passage 44 through which the leader 12 is loosely trained. The sides of the bushing 42, however, are provided with radial projections 46 which extend into the apertures 40 so as to ensure a strong connection between the bushing and the body 28.

A removable cover 48 is used to store and transport the fishing rig 10 when it is not in use. The cover 48 includes a flexible plastic disk 50 having an integral, U-shaped rim 52 formed about its periphery. As shown, the U-shaped rim 52 defines a circular channel 54 adapted to snugly receive and retain the rim 32 of the guide body 28. Extending outwardly from the U-shaped rim 52 is a tab 56 having a keyhole slot 58 for attaching the cover 48 and the remainder of the rig 10 to a fishing rod 60.

Use of the rig 10 is uncomplicated. The cover 48 is first removed and the hook 14 is baited in the usual manner. Next, the rig 10 is cast by means of the fishing rod 60 into a body of water. On impact with the water, the hook 14 will be protected within the guard 20 which tends to slide to the end of the leader 12 which is not directly attached to the line 18. The apertures 38 permit the guard 20 to rapidly fill with water and sink without appreciable drifting in all but strong currents. During the descent to the bottom of the water body, the float 22 withdraws the hook 14 from the guard 20 where it remains in a position to attract and catch fish. The bead 26 prevents the entry of the swivel 16 into the bushing 42 and thereby limits the withdrawal of the hook 14 from the guard 20.

The buoyancy of the float 22 may be increased or decreased as required by the density of the water being fished and the density and volume of the bait attached to the hook 14. To this end, the float 22 is provided with a hollow body 62 having a pair of opposed openings 64 and 66 and a tapered guide sleeve 68 extending through the opposed openings. The guide sleeve 68 is selectively removable from the openings 64 and 66 such that a volume of water or other dense matter can be admitted into the hollow body 62 to adjust the buoyancy thereof. As shown, the guide sleeve 68 slidably receives the leader 12.

Upon retrieval of the rig 10 by a user, the float 22 and the hook 14 are automatically moved into a protected position within the conical portion 30 of the guard 20. Neither the hook 14 nor the float 22 can become snagged upon rocks, submerged vegetation or other obstacles while being pulled through the water. The flexible construction of the body 28 permits it to be temporarily deformed when passing through any tight spots.

Should a fish be caught on the hook 14, the guard 20 covers the head of the fish and reduces the tendency of the fish to swim for cover and potential snags. Lifting the rig 10 from the water to unhook the fish or to check the hook 14 is easy since the apertures 38 in the guard 20 eliminate suction.

While the invention has been described with a high degree of particularity, it will be appreciated by those skilled in the art that numerous modifications may be made thereto. Therefore, it is to be understood that the present invention is not limited to the sole embodiment described above, but encompasses any and all embodiments within the scope of the following claims.

I claim:

1. A fishing rig, comprising:
   a flexible leader;
   a fishing hook secured to said leader;
   a float slidably positioned on said leader adjacent said fishing hook; and,
   a guide slidably positioned on said leader adjacent said float and remote from said fishing hook, said guide including a conically-shaped body having opposed, large and small ends with said large end being positioned adjacent said float, said guide also including a tapered bore extending through said opposed, large and small ends adapted to selectively receive therein said fishing hook and said float.

2. The fishing rig according to claim 1 wherein said conically-shaped body further includes a plurality of apertures intersecting said tapered bore.

3. The fishing rig according to claim 1 wherein said conically-shaped body is formed of flexible plastic.

4. The fishing rig according to claim 1 wherein said guide further comprises a metallic bushing secured within said tapered bore at said small end of said body, said bushing having a passage in axial alignment with said tapered bore, said bushing also having a projection extending into said body to ensure a strong connection between said bushing and said body.

5. The fishing hook guard according to claim 4 wherein said metallic bushing is formed of lead.

6. The fishing rig according to claim 1 where in s aid float further comprises a hollow body having a pair of opposed openings and a tapered guide sleeve extending through said opposed openings, said guide sleeve being selectively removable from said opposed openings such that matter can be admitted into said hollow body to adjust the buoyancy thereof, and said guide sleeve slidably receiving said leader therein.

7. The fishing rig according to claim 1 further comprising a removable cover adapted for selective attachment to said large end of said conically-shaped body, said cover having a tab extending therefrom and said tab having a keyhole slot for attachment to a fishing rod.

8. The fishing rig, comprising:
   a leader having first and second ends;
   a fishing hook secured to said first end of said leader;
   a swivel secured to said second end of said leader;
   a float slidably positioned on said leader; and,
   a guide slidably positioned on said leader between said float and said swivel, said guide including a conically-shaped body having opposed, large and small ends with said large end thereof opening toward said first end of said leader, said guide also including a tapered bore extending through said opposed, large and small ends adapted to selectively receive therein said fishing hook and said float, and said body further including a plurality of aperture s intersecting said tapered bore.

9. The fishing rig according to claim 8 wherein said conically-shaped body is formed of flexible plastic.

10. The fishing rig according to claim 8 wherein said guide further comprises a metallic bushing secured within said tapered bore at said small end of said body, said bushing having a passage in axial alignment with said tapered bore, said bushing also having a projection extending into said body to ensure a strong connection between said bushing and said body.

11. The fishing hook guard according to claim 10 wherein said metallic bushing is formed of lead.

12. The fishing rig according to claim 8 wherein said float further comprises a hollow body having a pair of opposed openings and a tapered guide sleeve extending through said opposed openings, said guide sleeve being selectively removable from said opposed openings such that matter can be admitted into said hollow body to adjust the buoyancy thereof, and said guide sleeve slidably receiving said leader therein.

13. The fishing rig according to claim 8 further comprising a removable cover adapted for selective attachment to said large end of said conically-shaped body, said cover having a tab extending therefrom and said tab having a keyhole slot for attachment to a fishing rod.

* * * * *